(12) United States Patent
Sivanesan et al.

(10) Patent No.: US 9,405,663 B2
(45) Date of Patent: Aug. 2, 2016

(54) GENERATING AN OPTIMIZED TEST SUITE FROM MODELS FOR USE IN A SOFTWARE TESTING ENVIRONMENT

(71) Applicant: HCL Technologies Ltd., Chennai, Tamil Nadu (IN)

(72) Inventors: Arivukarasu Sivanesan, Chennai (IN); Ambica Jain, Noida (IN); Johnson Selwyn, Chennai (IN); S U M Prasad Dhanyamraju, Hyderabad (IN)

(73) Assignee: HCL Technologies Ltd., Chennai (IN)

( * ) Notice: Subject to any disclaimer, the term of this patent is extended or adjusted under 35 U.S.C. 154(b) by 0 days.

(21) Appl. No.: 14/737,651

(22) Filed: Jun. 12, 2015

(65) Prior Publication Data

US 2015/0378875 A1   Dec. 31, 2015

(51) Int. Cl.
*G06F 13/00* (2006.01)
*G06F 11/36* (2006.01)

(52) U.S. Cl.
CPC ................... *G06F 11/3684* (2013.01)

(58) Field of Classification Search
CPC ..... G06F 8/30; G06F 9/45512; G06F 11/3688
USPC ................... 717/106, 124; 719/320
See application file for complete search history.

(56) References Cited

U.S. PATENT DOCUMENTS

| | | | | |
|---|---|---|---|---|
| 2014/0172871 A1* | 6/2014 | Brayman | ............ | G06F 11/3664 707/741 |
| 2015/0227452 A1* | 8/2015 | Raghavan | ........... | G06F 11/3684 717/124 |

* cited by examiner

*Primary Examiner* — Andy Ho
(74) *Attorney, Agent, or Firm* — VKM Law Group

(57) ABSTRACT

Generating an optimized test suite for use in a software testing environment. This invention relates to software testing systems, and more particularly to generating an optimized test suite for using in a software testing system. The principal object of this invention is to propose a method and system for generation of an optimized test suite using a sequential process with a combination of custom and generic optimization techniques.

12 Claims, 5 Drawing Sheets though automation to test each functionality of the Application Under Test (AUT). Initially a testing team has to manually write the test cases and then executing all the test cases in a short span of time available for testing is difficult. The testing team has to ensure that the coverage of the test cases covers the AUT, while writing the test cases.

GENERATING AN OPTIMIZED TEST SUITE FROM MODELS FOR USE IN A SOFTWARE TESTING ENVIRONMENT

CROSS-REFERENCE TO RELATED APPLICATIONS

This application claims priority to Indian application no. 3145/CHE/2014 filed on Jun. 27, 2014, the complete disclosure of which, in its entirety, is herein incorporated by reference.

FIELD OF INVENTION

This invention relates to software testing systems, and more particularly to generating an optimized test suite for using in a software testing system.

BACKGROUND OF INVENTION

Traditionally, in process oriented projects, software testing has been carried out by writing test cases and executing them either manually or through automation to test each functionality of the Application Under Test (AUT). Initially a testing team has to manually write the test cases and then executing all the test cases in a short span of time available for testing is difficult. The testing team has to ensure that the coverage of the test cases covers the AUT, while writing the test cases.

To achieve this, development and testing resources that include personnel and the infrastructure, depending on the project, have to be increased enormously leading to very huge cost and time. Also, often increasing resources may not be a feasible option as the resources may not be available on-demand every time. Also, the software may be developed for multiple environments, necessitating testing in all the multiple environments which increases the challenge. Software development methodologies like Agile cause an even bigger challenge due to the frequent releases (as a result of shorter life cycles).

Currently, Model Based Testing (MBT) methodology is an alternative to writing test cases/test scripts manually and has been gaining grounds, especially for embedded and larger critical applications space. In model based testing methodology, an exhaustive set of test cases and test scripts for automated execution are generated automatically, resulting in better test coverage. Test cases/test scripts are generated using all the permutations and combinations of the data set of each object within a state of the application. Due to this, an exhaustive testing is performed on the AUT. Depending on the nature of the AUT, most of the times, such exhaustive testing may not be required.

The MBT methodology is acceptable for applications for which the cumulative automated and manual testing cycle fits comfortably in the budgeted regression cycle period. However, for the rest of the applications, a reduced or an optimized test suite has to be identified from the generated test suite. This is generally performed manually and it depends on the skill of the team to identify the test cases which will form part of the optimized test suite. This may result in loss in proper test coverage of the AUT. Also, the testing team has to spend a significant amount of team in identifying the test cases. This may result in a reduction in testing time available to the team, which may adversely affect the quality of the testing.

OBJECT OF INVENTION

The principal object of this invention is to propose a method and system for generation of an optimized test suite using a sequential process with a combination of custom and generic optimization techniques.

STATEMENT OF INVENTION

Accordingly the invention provides a method for generating an optimized test suite for testing an AUT (Application Under Test) in a software testing system, the method comprising of enabling a user to enter a filtering criteria by the optimization engine, on the optimization engine receiving information related to the AUT; filtering the requirements by the optimization engine, based on the at least one target environment; selecting the requirements for test execution by the optimization engine based on the risk index; identifying final requirement suite for test execution by the optimization engine; filtering test data by the optimization engine based on current test environment; optimizing the filtered test data by the optimization engine by applying orthogonal array methodology; and triggering generation of test cases and test scripts by the optimization engine for at least one model, wherein the at least one model is selected based on the final optimized requirements suite and the filtered and optimized test data of each of the at least one model.

Also, provided herein is a system for generating an optimized test suite for testing an AUT (Application Under Test) in a software testing system, the system configured for enabling a user to enter a filtering criteria, on receiving information related to the AUT, wherein the information comprises of requirements, information associated with each of the requirements, relevant test data, at least one target environment for testing in the current testing cycle, project information, historical execution of the AUT and data required to calculate a risk-index for each of the requirement; filtering the requirements, based on the at least one target environment; selecting the requirements for test execution based on the risk index; identifying final requirement suite for test execution; filtering models based on the final requirement suite to select at least one model; filtering test data associated with the at least one selected model based on at least one target environment for testing; optimizing the filtered test data by applying orthogonal array methodology; and triggering generation of test cases and test scripts for at least one selected model, based on the final requirements suite and the filtered and optimized test data.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, through out which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 2:
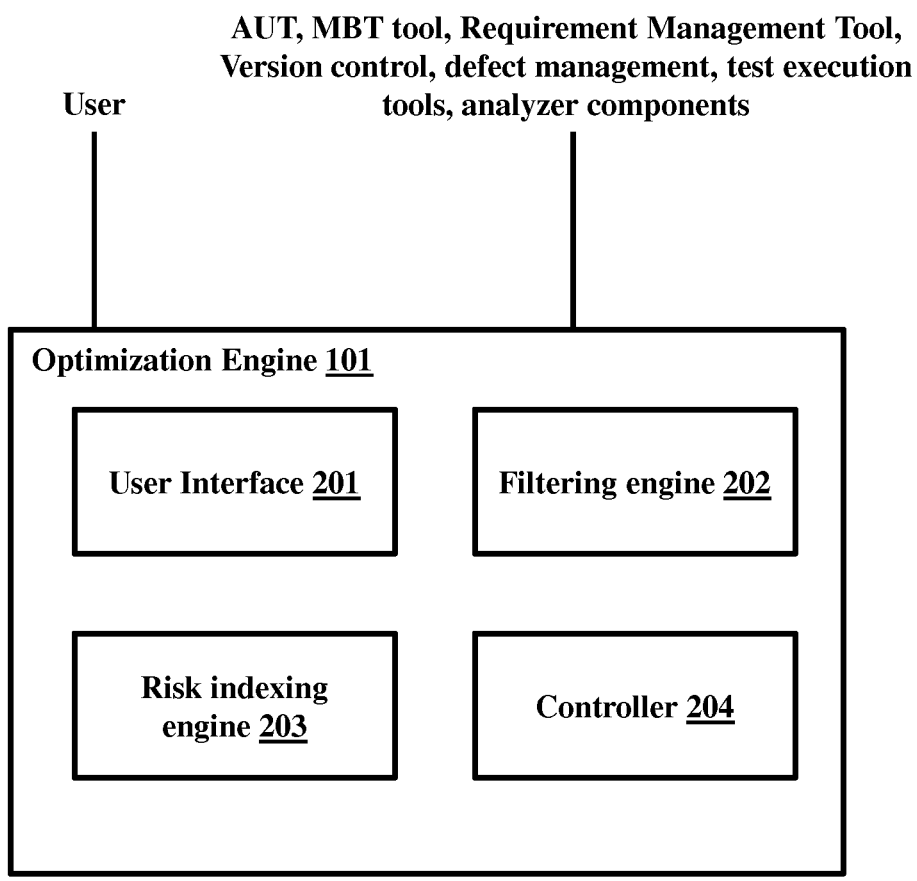
FIG. 2 depicts an optimization engine, according to embodiments as disclosed herein.
Figure 3:
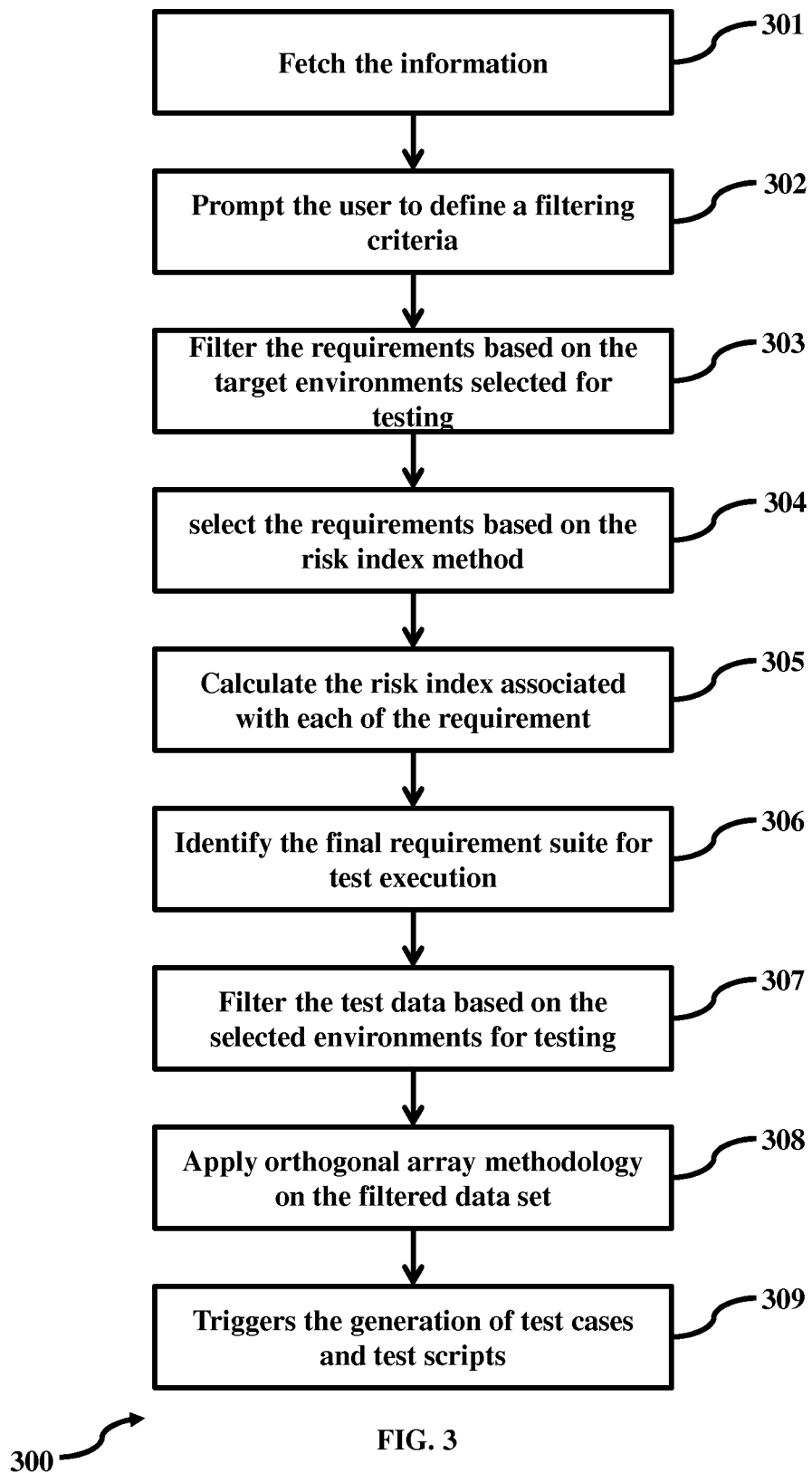
FIG. 3 is a flowchart illustrating the process of generating an optimum test suite, according to embodiments as disclosed herein.

The embodiments herein propose a method and system for generation of an optimized test suite using a sequential process with a combination of custom and generic optimization techniques. Referring now to the drawings, and more particularly to FIGS. 1 through 3, where similar reference characters denote corresponding features consistently throughout the figures, there are shown preferred embodiments.

Figure 1A:
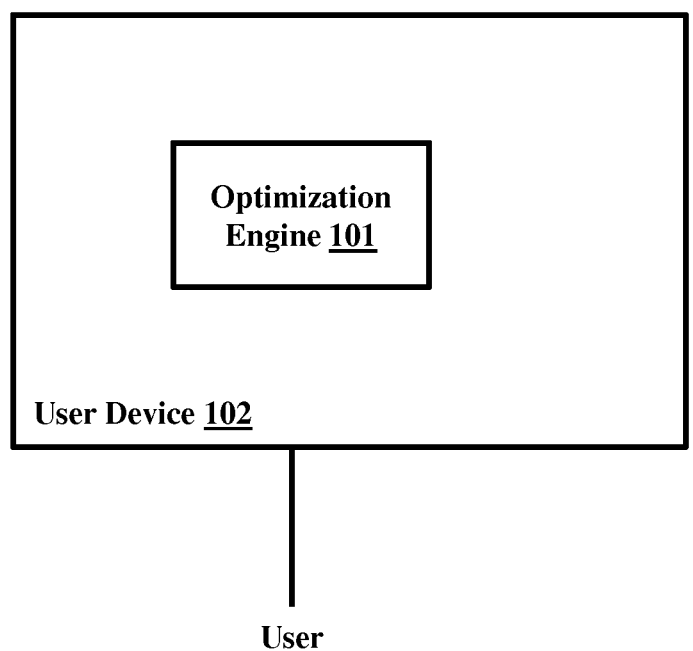
FIGS. 1a, 1b, and 1c depict various implementations of a system which enables the system to generate an optimized test suite, according to embodiments as disclosed herein.
Figure 1B:
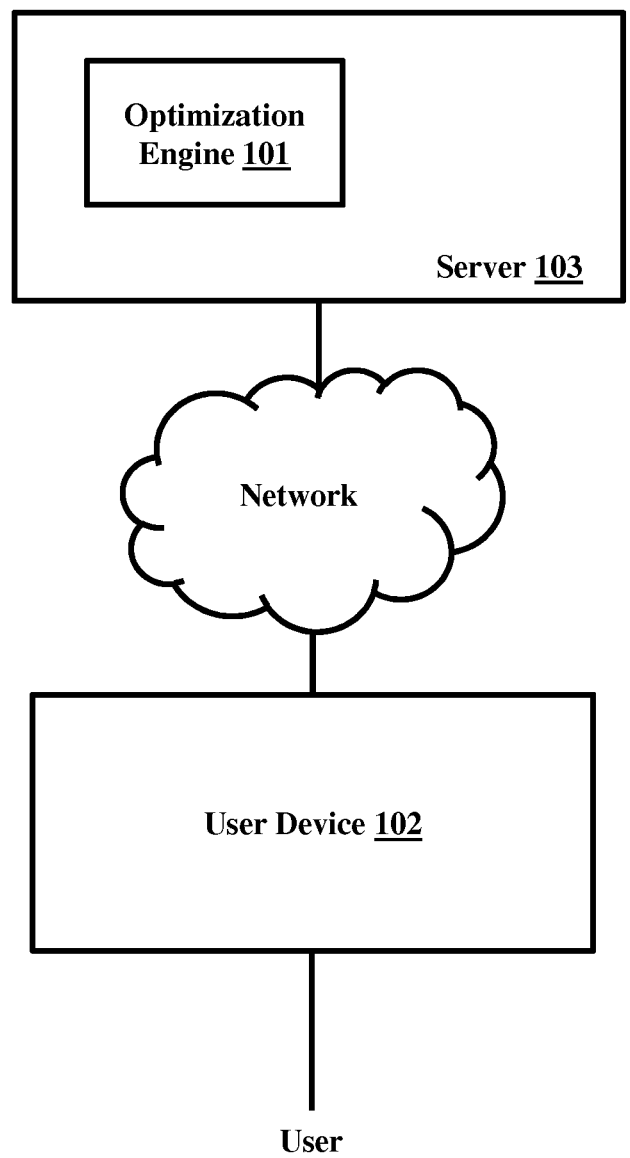
Figure 1C:
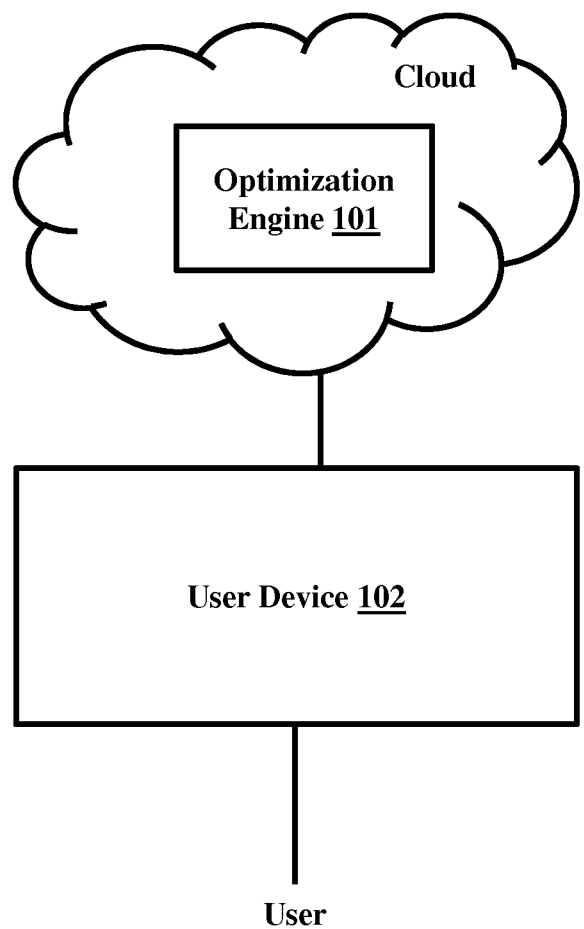

FIGS. 1a, 1b, and 1c depict various implementations of a system which enables the system to generate an optimized test suite, according to embodiments as disclosed herein. FIG. 1a depicts an optimization engine 101 present within a user device 102. The user device 102 enables a user to test an AUT (Application Under Test), wherein the AUT may be present within the user device 102 or located remotely in a location accessible to the user device 102 (such as a database, a remote server, a remote machine and so on). The user device 102 may be at least one of a computer, a laptop, a tablet, a mobile phone or any other device capable of enabling the user to access the AUT.

FIG. 1b depicts the optimization engine 101 present within a server 103. The server 103 may be any type of commonly available computing system used for huge computing, data management and storage, etc., which may comprise of at least one of a display monitor, keyboard, mouse, various fixed disk drives, floppy disk and /or optical disk drive. The server 103 may be a virtual system residing in a local network server that may be allotted with a logical RAM, logical storage and logical processors. The server 103 may be connected to the user device 102 through a network. The network may be at least one of a local area network, a wide area network, a virtual private network, the internet and so on. The optimization engine 101 may access the AUT and information related to the AUT (such as the test cases, the test plans, the strategy, the features of the AUT and so on). The optimization engine 101 may access the AUT and information related to the AUT from at least one of the user device 101, the server 103 or any other suitable location where the AUT and information related to the AUT may be stored. The AUT and information related to the AUT may be present in more than one location. In an embodiment herein, the optimization engine 101 may be distributed in nature, wherein the functionalities of the optimization engine 101 may be distributed over a plurality of servers.

FIG. 1c depicts the optimization engine 101 deployed in the cloud. The user device 102 may be connected to the cloud through the network. The network may be at least one of a local area network, a wide area network, a virtual private network, the internet and so on. The optimization engine 101 may access the AUT and information related to the AUT. The optimization engine 101 may access the AUT and information related to the AUT from at least one of the user device 101, the server 103, the cloud or any other suitable location where the AUT and information related to the AUT may be stored. The AUT and information related to the AUT may be present in more than one location.

FIG. 2 depicts an optimization engine, according to embodiments as disclosed herein. The optimization engine 101, as depicted, comprises of a User Interface (UI) 201, a filtering engine 202, a risk indexing engine 203 and a controller 204. The optimization engine 101 may interface with a user through the UI 201. The optimization engine 101 may interface with at least one module such as a MBT tool, a requirement management tool, version control, a defect management tool, at least one test execution tool, at least one analyzer component and so on. In an embodiment herein, the optimization engine 101 may be configured as a plugin to the MBT tool. In an embodiment herein, the optimization engine 101 may be standalone.

The optimization engine 101 may broadly comprise of an interface that helps the user to query the requirements management tool and to receive the requirements along with their associated environment details again the requirements management tool in response to the query, a module that acts upon the data either received manually or through automation to produce the optimized requirement suite and provide them to the user or to store them in a permanent or a temporary storage device and another module that shall be part of the MBT tool contains the processor for fetching the optimized requirement suite and filter the parts of the model to automate test case generation only to those selected requirements/parts of the application. The query may comprise of inputs (which may comprise of Project ID, Release ID/Release Name and so on).

The controller 204 fetches information comprising of requirements, information associated with each of the requirements, relevant test data, environments for testing the current testing cycle, project information (such as project ID, release ID and so on), historical execution of the AUT and related data that will be required to calculate the risk-index of each of the requirement. Consider an example, wherein an authentication mechanism is present in a global application, wherein the authentication mechanism comprises of a pre-defined user ID for each user and code that could be modified by the user at point of time. Further the default language may be considered as English, but a user may choose a language of his preference. Here the environment may be Windows 2008 R2 SVR (2), Oracle Sun Solaris and so on. Example types of authentication data may be "User1"/"passcode#1"/"English", "Administrator"/"$$pass##"/"English", "administrateur"/"passcode1234#"/"French" and so on.

The controller 204 may fetch the information from the requirement management tool. A user may also use the UI 201 to upload at least one file (for example, a flat file), wherein the uploaded file comprises of the information. After the requirements and its associated details are received by the controller 204, the controller 204 may prompt the user through the UI 201 to define filtering criteria. The definition of the filtering criteria may be in terms of an upper and a lower limit of the risk index, the environment(s) for which the testing have to be done and so on. The risk index may depend on at least one risk parameter, wherein the risk parameter may be defined as one of the factors related to an application that influences the potential failure of at least one feature of the AUT. The probability of failure of a particular functionality of the application can be determined by determining the probability of occurrence of one or more of the risk indexes related to that requirement. Examples of Risk Parameters are complexity, requirement maturity, frequency of requirement change and so on. For example, if 'Complexity' parameter value is 'High' for a particular functionality, then the probability of failure of this functionality is high; whereas if the value is low', then the probability of failure is low. The impact that each risk can cause to the user (hereinafter referred to as 'severity factor' and may be defined for each requirement), if it occurs, can be determined manually with the expert knowledge on the product or the severity factor can be derived from external sources like requirements management tool if the severity factor is already pre-defined.

The optimization engine 101 further optimizes the requirements and identifies the final requirements suite. After the inputs required for optimizing the requirements are received, the filtering engine 202 performs the requirements in three stages. Initially, the filtering engine 202 filters the requirements based on the target environments selected for testing. If the filtering engine 202 discovers that any of the requirement's associated environments is not available in the list of environments selected for testing, then the filtering engine 202 does not select the requirement. If the filtering engine 202 discovers that any of the requirement's associated environments is available in the list of environments selected for testing, then the filtering engine 202 selects the requirement. The filtering engine 202 selects the requirements based on the risk index method. The controller 204 calculates the risk index associated with each of the requirements selected by the filtering engine 202 through a suitable method such as the standard risk based methodology, risk assigned based on changes or any other analytical means. Based on the risk category selected by the user, the controller 204 identifies the final requirement suite for test execution. The controller 204 filters the test data based on the selected environments for testing; wherein this filtering may be done only in the models associated with the final optimized requirement suite prepared for testing. In an embodiment herein, the controller 204 may apply orthogonal array methodology on the filtered data set to further optimize it. The controller 204 may further trigger the generation of test cases and optionally test scripts for only the sub-models that were selected based on the final requirements suite and only for the filtered and optimized data-set that were filtered using the environments of interest for testing and optimized using a suitable means such as Orthogonal array methodology. In addition to this, based on the user selection, the controller 204 may provide indications to apply MBT based optimization techniques during the test case generation process.

In an embodiment herein, the generated test cases and test scripts may be sent to a test execution engine. The test execution engine may execute the test cases. The optimization engine 101 may verify data received from the test execution engine related to the execution of the test cases (such as failure/success of the test cases, the data generated as a result of running the test cases and so on). The optimization engine 101 may further report the results and data associated with the test cases.

The modules comprising the optimization engine 101 may be present in a single location (such as the user device 102, the server(s) 102, the cloud and so on). The module comprising the optimization engine 101 may be present in a distributed manner, with the modules being distributed across at least two of the user device 102, the server(s) 103, the cloud and so on.

FIG. 3 is a flowchart illustrating the process of generating an optimum test suite, according to embodiments as disclosed herein. The optimization engine 101 fetches (301) information comprising of requirements, information associated with each of the requirements, relevant test data, environments for testing the current testing cycle, project information (such as project ID, release ID and so on), historical execution of the AUT and related data that will be required to calculate the risk-index of each of the requirement. The optimization engine 101 may fetch the information from the requirement management tool. A user may also use the UI to upload at least one file (for example, a flat file), wherein the uploaded file comprises of the information. After the requirements and its associated details are received, the optimization engine 101 prompts (302) the user to define the filtering criteria. The filtering criteria may be in terms of an upper and a lower limit of the risk index, the environment(s) for which the testing have to be done and so on. The risk index may depend on at least one risk parameter. After the inputs required for optimizing the requirements are received, the optimization engine 101 filters (303) the requirements based on the target environments selected for testing (current test environment). If the optimization engine 101 discovers that any of the requirement's associated environments is not available in the list of environments selected for testing, then the optimization engine 101 does not select the requirement. If the optimization engine 101 discovers that any of the requirement's associated environments is available in the list of environments selected for testing, then the optimization engine 101 selects the requirement. The optimization engine 101 selects (304) the requirements based on the risk index method. The optimization engine 101 calculates (305) the risk index associated with each of the requirement through a suitable method such as the standard risk based methodology, risk assigned based on changes or any other analytical means. Based on the risk category selected by the user, the optimization engine 101 identifies (306) the final requirement suite for test execution. The optimization engine 101 filters (307) the test data based on the selected environments for testing; wherein this filtering may be done only in the models associated with the final optimized requirement suite prepared for testing. In an embodiment herein, the optimization engine 101 applies (308) orthogonal array methodology on the filtered data set to further optimize the data. The optimization engine 101 further triggers (309) the generation of test cases and test scripts for only sub-models that were selected based on the final requirements suite and only for the filtered and optimized data-set that were filtered using the environments of interest for testing and optimized through Orthogonal array methodology. The various actions in method 300 may be performed in the order presented, in a different order or simultaneously. Further, in some embodiments, some actions listed in FIG. 3 may be omitted.

Embodiments disclosed herein may be implemented in any vertical/industry that utilize software, including application software testing, either wholly or partially based on the need and the applicability.

Embodiments disclosed herein enable derivation of an optimized test suite by combining an approach based on the risk associated with a functionality/requirement with combinatorial optimization methodology. Embodiments disclosed herein further assist in achieving the optimized test suite and completing regression testing in a shorter span.

Embodiments disclosed herein result in a reduction in testing cycle times by performing optimization at the requirements level in two steps—environment and prioritization based on risk, and further based on the data set level, helping in generating a reduced test suite which in turn helps in testing only the areas of interest for the current test cycle. Due to this optimization, regression testing cycle time is largely reduced. Since the optimization is done based on the required environment selection and based on risks associated with each requirement, required parts for this current cycle are only tested. This leads to a sufficient amount time and may support for an exhaustive testing on the selected requirements/parts of the application. Thus, a high quality testing can be done for the required portions of the application (for the current cycle).

As embodiments disclosed herein are present one layer above the Model Based Testing methodology, this approach can be used as like MBT. That is, this would be applicable for testing any type of software applications/products irrespective of technology/programming language/platforms in specific. The savings of effort or the corresponding cost would significantly increase as the size or the complexity/full test execution time of the AUT increases.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for generating an optimized test suite for testing an AUT (Application Under Test) in a software testing system, said method comprising:
    enabling a user to enter a filtering criteria by a optimization engine, on the optimization engine receiving information related to the AUT, wherein the information comprises of at least one of a requirement, an information associated with each of the requirement, a model of the AUT, a relevant test data, at least one target environment for testing in a current testing cycle, a project information, a historical execution of the AUT and a data required to calculate a risk-index for each of the requirement;
    filtering the requirements by the optimization engine, based on the at least one target environment;
    selecting the requirements for test execution by the optimization engine based on the risk index;
    identifying final requirement suite for test execution by the optimization engine;
    filtering test data by the optimization engine based on current test environment;
    optimizing the filtered test data by the optimization engine by applying orthogonal array methodology; and
    triggering generation of test cases and test scripts by the optimization engine for at least one model, wherein at least one model is selected based on the final optimized requirements suite and the filtered and optimized test data of each of the at least one model.

2. The method, as claimed in claim 1, wherein the information is fetched from a requirement management tool.

3. The method, as claimed in claim 1, wherein the information is received from the user.

4. The method, as claimed in claim 1, wherein the filtering criteria is in terms of an upper and a lower limit of the risk index; and the environment(s) for which the testing have to be done.

5. The method, as claimed in claim 1, wherein the method further comprises of calculating the risk index associated with each of the requirement by the optimization engine using at least one of a standard risk based methodology and a risk assigned based on at least one parameter.

6. The method as claimed in claim 1, wherein the method further comprises:
    executing the generated test cases and test scripts by a test execution engine;
    verifying data received from the test execution engine by the optimization engine, wherein the data received from the test execution engine is related to the executed test cases and test scripts; and
    reporting data received from the test execution engine by the optimization engine.

7. A system for generating an optimized test suite for testing an AUT (Application Under Test) in a software testing system, the system configured for:
    enabling a user to enter a filtering criteria, on receiving information related to the AUT, wherein the information comprises of at least one of a requirement, an information associated with each of the requirement, a model of the AUT, a relevant test data, at least one target environment for testing in a current testing cycle, a project information, a historical execution of the AUT and a data required to calculate a risk-index for each of the requirement;
    filtering the requirements, based on the at least one target environment;
    selecting the requirements for test execution based on the risk index;
    identifying final requirement suite for test execution;
    filtering models based on the final requirement suite to select at least one model;
    filtering test data associated with the at least one selected model based on at least one target environment for testing;
    optimizing the filtered test data by applying orthogonal array methodology; and
    triggering generation of test cases and test scripts for at least one selected model, based on the final requirements suite and the filtered and optimized test data.

8. The system as claimed in claim 7, wherein the information is fetched from a requirement management tool.

9. The system as claimed in claim 7, wherein the system receives the information from the user.

10. The system, as claimed in claim 7, wherein the filtering criteria is in terms of an upper and a lower limit of the risk index; and the environment(s) for which the testing have to be done.

11. The system, as claimed in claim 7, wherein the system is further configured for calculating the risk index associated with each of the requirement using at least one of a standard risk based methodology and a risk assigned based on at least one parameter.

12. The system as claimed in claim 7, wherein the system is further configured for:
    executing the generated test cases and test scripts by a test execution engine;
    verifying data received from the test execution engine, wherein the data received from the test execution engine is related to the executed test cases and test scripts; and
    reporting data received from the test execution engine.

* * * * *